United States Patent [19]

Viertler

[11] Patent Number: 5,515,258

[45] Date of Patent: May 7, 1996

[54] DRIVE DEVICE FOR A PUSH-PULL STAGE

[75] Inventor: Rainer Viertler, Kirchheim, Germany

[73] Assignee: Siemens Aktiengesellschaft, Munich, Germany

[21] Appl. No.: 161,411

[22] Filed: Dec. 6, 1993

[30] Foreign Application Priority Data

Jan. 15, 1993 [DE] Germany ............... 43 00 981.6

[51] Int. Cl.$^6$ .................................................. H02M 3/335
[52] U.S. Cl. ................................................. 363/26; 363/98
[58] Field of Search .................. 363/26, 41, 98

[56] References Cited

U.S. PATENT DOCUMENTS

| | | | |
|---|---|---|---|
| 4,800,477 | 1/1989 | Esposito | 363/98 X |
| 4,843,532 | 6/1989 | Freedman | 363/26 |
| 5,012,058 | 4/1991 | Smith | 363/98 X |
| 5,055,762 | 10/1991 | Disser et al. | 318/811 |

OTHER PUBLICATIONS

"Drehstrommotor–Steuerung mit dem M 37704," Meckel, Electronik Industrie 7 (1992) pp. 38–39.
"Anwendungs–spezifischer 6–Bit–Motor–Controller," Seeger, Electronik 1 (1991) pp. 48–51.

*Primary Examiner*—Peter S. Wong
*Assistant Examiner*—Y. Jessica Han
*Attorney, Agent, or Firm*—Hill, Steadman & Simpson

[57] ABSTRACT

A drive device for a push-pull stage includes a microcontroller in the form of a pulse-width modulator which, starting with a selected switching frequency, varies the pulse-duty ratio (modulation) of the pulse-width modulated output signal and which, with chronological delay, controls the push-pull stage. The push-pull stage has at least one upper and one lower power switch, and the microcontroller has three pulse-width modulation outputs. The actual pulse-width modulated output signal is delivered at the first output, the modulated signal plus a dead time is delivered at the second output and is supplied to the lower power switch as a drive signal, and the dead time by itself is delivered at the third output. The drive signal for the upper power switch is formed by the difference between the modulated signal and the inverted dead time is automatically decreased in the limit region of the modulation, i.e., when the modulation approaches 100% or 0%, and one power switch is continuously switched on, whereas the other power switch is switched off during the same time. Beginning with a specific limit value of the modulation, a power bit is regularly delivered at a fourth output, which effects a 100% modulation.

16 Claims, 5 Drawing Sheets

DRIVE DEVICE FOR A PUSH-PULL STAGE

BACKGROUND OF THE INVENTION

1. Field of the Invention

The present invention is directed to a drive device for a push-pull stage of the type having a pulse-width modulator or a compare/capture unit in a microcontroller, or a microcontroller fashioned as a pulse-width modulator which varies the pulse-duty ratio of the pulse-width modulated output signal starting with a specific switching frequency and which, with a chronological delay, drives a push-pull stage having at least one upper power switch and one lower power switch.

2. Description of the Prior Art

Drive devices of the general type described above are employed in inverse rectifiers and frequency converters. Inverse rectifiers serve the purpose of converting a prescribed d.c voltage into a specific a.c. voltage having a defined frequency. Frequency converters convert an a.c voltage having a given voltage value and a given frequency into a different a.c. voltage having a (possibly) different frequency or convert a single-phase a.c. voltage into, for example, a three-phase a.c. voltage. In addition to including power electronics (push-pull half bridge or push-pull full bridge), known inverse rectifiers and frequency converters include a pulse-width modulator, or a microprocessor or microcontroller designed for that purpose. Drive devices for circuits and modules of this type are disclosed in many sources in the technological literature, for example in "Anwendungsbeispiele," (applications example) Siemens AG, Bereich Bauelemente, and "Electronic Industrie 7-1992: Drehstrommotorsteuerung mit dem M 37704" referring to a microcontroller manufactured by Mitsubishi. An article in Elektronik 1/1991 describes the use of a 16-bit motor controller which was specifically developed for controlling three-phase motors and brushless d.c. motors. This microcontroller is extremely expensive and is over-dimensioned for use in controlling an inverse rectifier, for example which employs signals having only one phase.

For an inverse rectifier, the alternating voltage across the load (motor, transducer, etc.) should be as close as possible to the voltage value of the d.c. voltage, or of the intermediate circuit voltage. This means that the pulse-duty ratio should change during a cycle so as to exhibit a 100% modulation for the upper half of the sinusoidal wave, and a 0% modulation for the lower half of the sinusoidal wave, i.e., the frequency converter or inverse rectifier must be operated in a full block mode.

In modern power electronics, power semiconductors are operated in a push-pull output stage configuration above a certain power level. Power semiconductors have a so-called protective time associated therewith, which is the time which must exist to prevent an overlap of brief duration of the power semiconductor operating in the switched mode and their pulse-like loading. Failure to observe the proper protective time can result in the destruction of the power semiconductor. The protective time will be of different lengths for different types of power semiconductors (Bipolar, MOSFET, (BT, MCT etc.) and the operation thereof. Storage and delay times of such power semiconductors are also highly temperature-dependent, i.e., the protective times during which neither of the two power semiconductors in a push-pull stage can be simultaneously driven generally lengthen with increasing temperature. The drive and the separation of potential due to the higher-ranking control also have storage and delay times associated therewith. Such power semiconductors are therefore usually driven with shortened drive pulses. The output pulses of the modulator are delayed with a programmable dead time, so that the power semiconductors do not have any switching overlap. For an optimum exploitation of the power semiconductors, the protective time or the dead time must be as short as possible. The protective time or dead time, however, must not be selected so short as to overload the power semiconductor, even under worst-case conditions.

SUMMARY OF THE INVENTION

It is an object of the present invention to provide a drive device for a push-pull stage which has an enhanced efficiency compared to known devices, i.e., to permit the push-pull stage to be operated in a full block mode.

The above object is achieved in accordance with the principles of the present invention in a drive device for a push-pull stage of the type having means for generating pulse-width modulated pulses with a variable pulse-duty ratio, wherein the pulse-width modulator means has three pulse-width modulation outputs. The actual pulse-width modulated output signal is delivered at a first of these outputs, the modulated signal being also returned to the control means for the pulse-width modulator. The modulation signal plus a dead time is delivered at a second of the outputs, and is supplies as a drive signal to the lower power switch of the push-pull stage. A signal corresponding to the dead time is delivered at a third of the outputs as a further pulse-width modulated output signal. The drive signal for the upper power switch of the push-pull stage is formed by the difference been the modulated signal and the inverted dead time. The dead time is automatically shortened in the limit region of the modulation, i.e., as the modulation approaches 100% or 0%. One of the power switches is continually switched on and the other power switch is continually switched off for the same time.

Three pulse-width modulators can be provided which are integrated in the microcontroller, respectively providing the three pulse-width modulation outputs. As noted above, the first pulse-width modulation output supplies the actual modulation signal, the second output supplies the modulation signal plus the dead time, and the third output supplies only the dead time. A new modulation signal, which represents one of the drive signals for one of the push-pull power switches, is derived by combining the other two output signals. The actual modulation signal supplied at the first output forms the other drive signal for the other push-pull power switch. The three modulations signals can be combined on the basis of appropriate programming of the microcontroller so that the range of modulation can be swept from 0% through 100%.

If one of the two power semiconductors in the push-pull stage is permanently disconnected at a half-bridge in the limit region of the modulation (i.e., as the modulation approaches 0% or approaches 100%), the dead time can then approach zero. In this manner, the other power semiconductor can be permanently switched on (full block mode) and the switching losses in the power semiconductors and in the peripheral equipment are eliminated at this point in time.

A further advantage of the invention is that it permits full utilization of the voltage-time area (i.e., the integrated area beneath the signal curve). This permits, for example, operation of a brushless d.c. motor at the voltage limit characteristic.

Given a required power, the current through the power semiconductor can thus assume a lower value; efficiency is highest when full block modulation is used. Additionally, the modulation limits are equidistant from the midpoint of the modulation (at 50%), which means that the drive is a symmetrical drive. Given an inductive load, a single-sided magnetization can not occur solely by virtue of operation of the drive itself.

The modulation signal which is returned to the microcontroller informs the software operating within the microcontroller when the pulse-width modulation has been completed, so that the microcontroller can perform different functions until the start of the next cycle.

In a further embodiment of the invention, an extremely short pulse is generated at regular intervals by the microcontroller, beginning with a specific modulation limit, this pulse being delivered at a fourth output of the microcontroller. This short pulse, referred to as a power bit, is logically combined with the output signals from the second output by means of a gate, and is supplied to the lower power switch. This is particularly advantageous for microcontrollers which cannot deliver a 100% modulated signal. Combining the power bit with the modulation nearly 100% pulse-width has the same result as if the modulation offers a full block modulation (100%).

If, for example, an alternating voltage of 50 Hz is generated by the drive device of the invention, the power bit can be generated by a 100 Hz clock.

If, for example, the leading edges of the modulated output signals at the output first and second outputs of the microcontroller do not coincide, a delay circuit can be arranged, for example, at the first output in a further embodiment of the invention. This delay circuit suppresses an undesired "needle pulse" which would otherwise be generated. The delay means can be formed by a capacitor or by an inverter. Unwanted, extremely short cross current components are thus avoided in the push-pull stage.

The required modulation values are usually stored in a value table, which can be provided in the memory of the microcontroller. It is also possible, however, to calculate the required modulation values in a real-time operation in the microcontroller itself. The dead time can be varied by an on-line operation performed in real time, the limits thereof being determined only by the range of modulation of the microprocessor, microcontroller or pulse-width modulator itself. This also has the advantage that the variable dead time can be calculated dependent on parameters of the semiconductor switches, so that internal influences (calculation or tables of the modulation values) as well as external influences (voltage or current characteristics) can be taken into consideration.

The generation of the three pulse-width modulated signals described above can ensue either externally with logic elements, or internally in the microcontroller itself, in which case the microcontroller will be designed specifically for this purpose and supplied with the appropriate software.

The generation of a fully digital pulse-width modulated signal having symmetrical dead time without a limitation in the range of modulation (i.e., a full block) is possible using the drive device of the invention. A wide range of microprocessors or microcontrollers is available for use as the pulse-width modulated signal generator of the invention. A specific microcontroller such as, for example, the Intel 80 C 196 KC need not necessarily be used.

DESCRIPTION OF THE PREFERRED EMBODIMENTS

Figure 1:
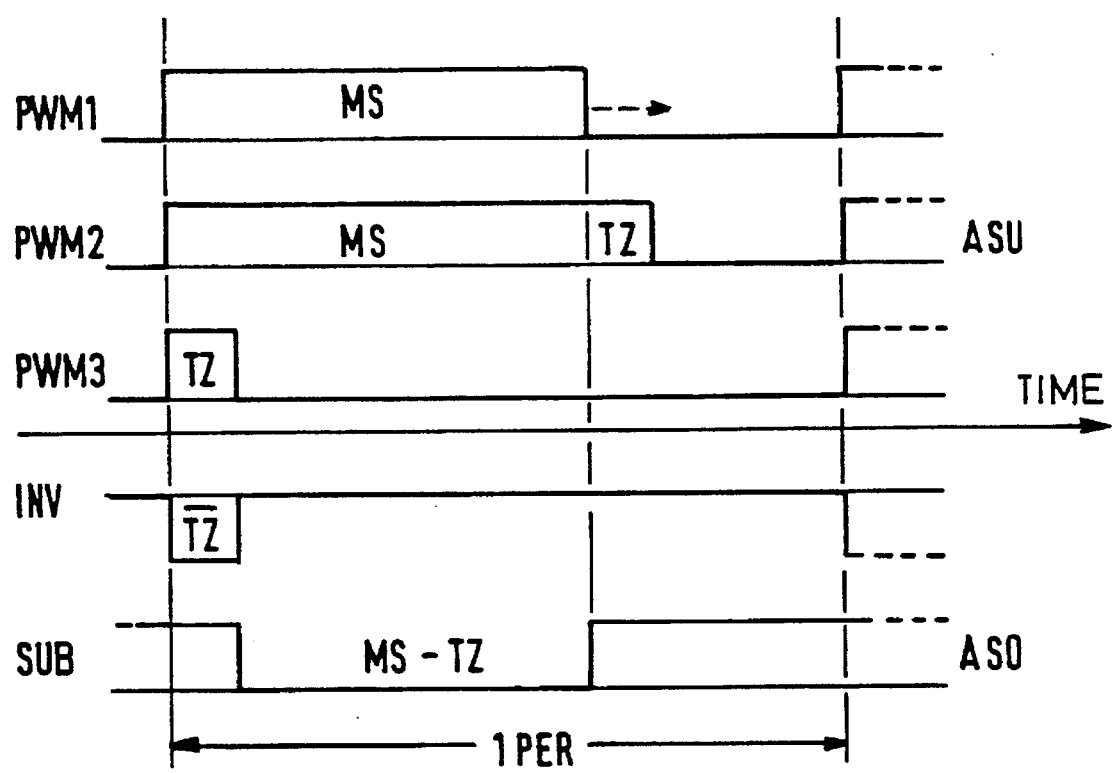
FIGS. 1 through 4 respectively show pulse diagrams for explaining the operation of the drive circuit constructed and operating in accordance with the principles of the present invention.
Figure 5:
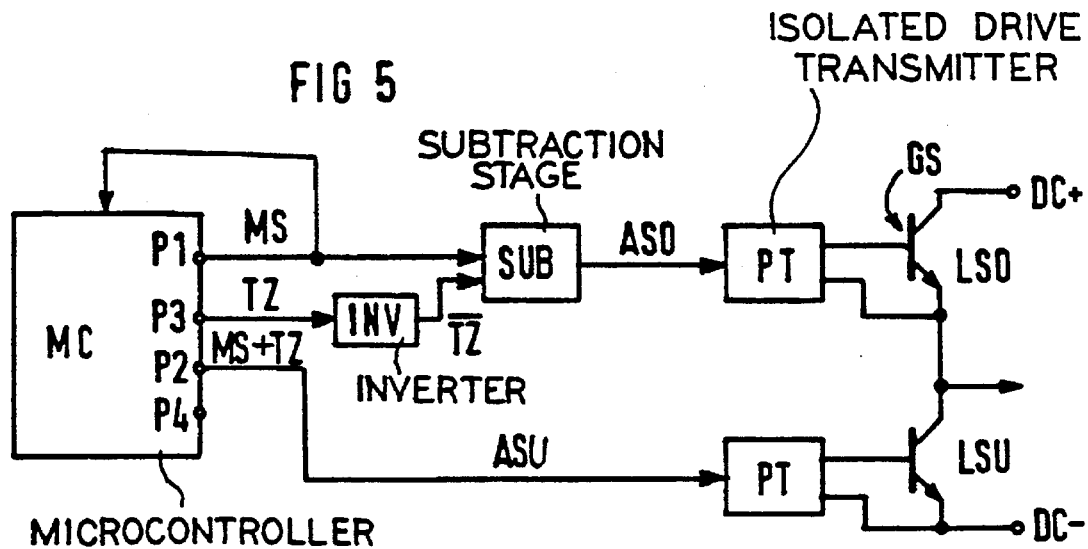
FIGS. 5 and 6 respectively show schematic circuit arrangements of embodiments of a drive device constructed in accordance with the principles of the present invention.

The basic functioning of a drive device constructed and operating in accordance with the principles of the present invention is shown in FIG. 1 with reference to pulse-time diagrams therein. A pulse-width modulated signal PWM1 is shown in FIG. 1, which is supplied at the output P1 of a microcontroller MC (shown in FIG. 5) as the actual modulation signal MS. A second pulse-width modulated signal PWM2 is supplied at the output P2 of the microcontroller MC, which is comprised of the modulation signal MS plus the dead time TZ. The signal PWM2 is supplied as a drive signal ASU to a lower power switch LSU of the push-pull stage. The signal PWM2 switches the lower power switch LSU in the case of a low-active drive with the zero level. A signal corresponding to the dead time TZ is delivered a third output P3 as a pulse-width modulation signal PWM3. This signal is inverted in an inverter stage INV, and is used in further processing as an inverted dead time signal $\overline{TZ}$. As can be seen in FIG. 5, the inverted dead time signal $\overline{TZ}$ is subtracted from the modulation signal MS in a subtraction stage SUB, and is supplied to the upper power switch LSO of the push-pull stage to be drive as a drive signal ASO. The signals ASO and ASU are respectively supplied to the power switches LSO and LSU via an isolated drive transmitter PT. Whereas the upper semiconductor power switch LSO is switched on as a consequence of the low level of the upper drive signal ASO, the lower semiconductor power switch LSU is switched off by the high level produced by the dead time signal TZ, which occurs twice. This corresponds to known operation of the drive for a power half-bridge.

Figure 2:
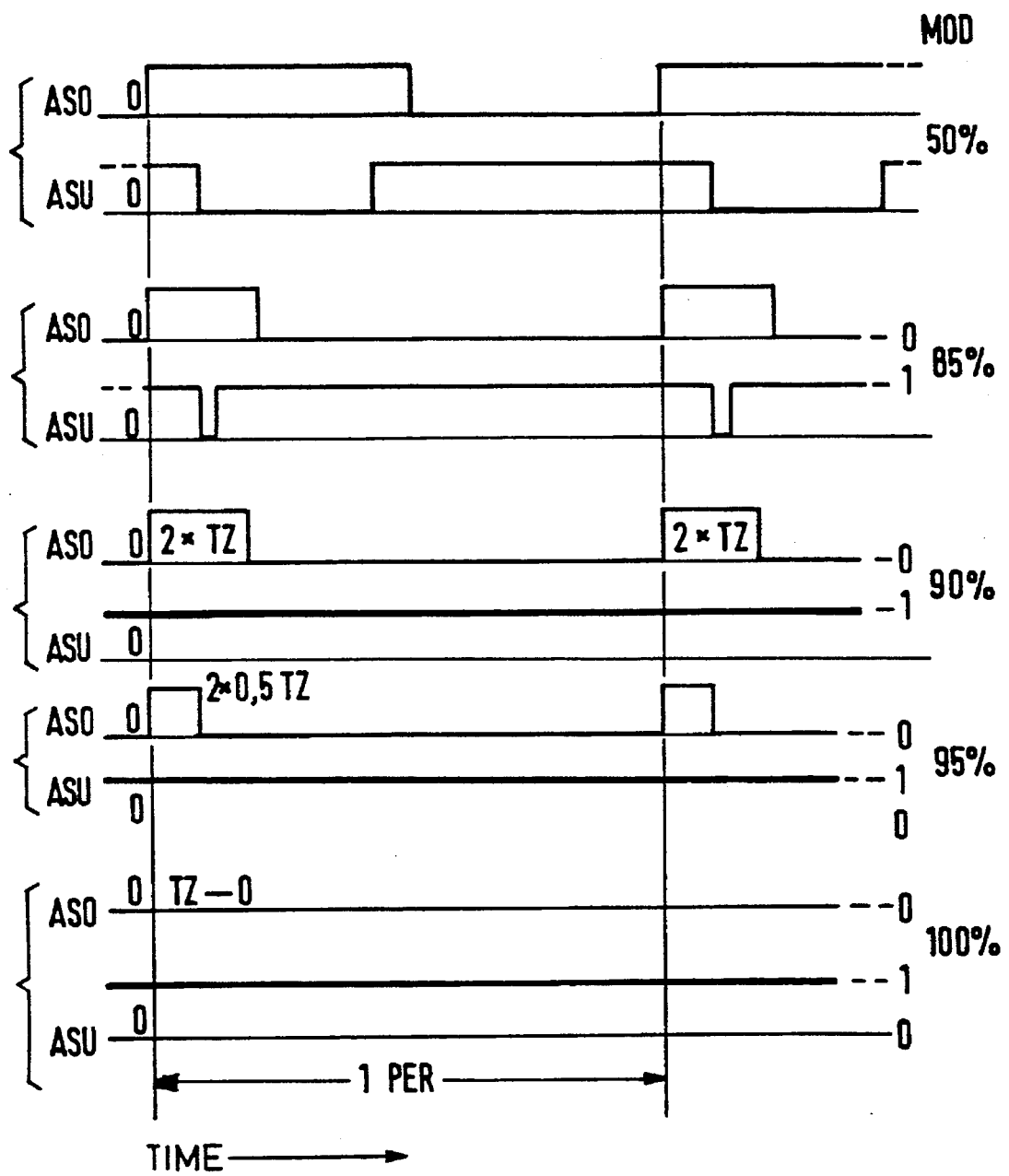

When one of the two signals ASO or ASU enters into the boundary region of a cycle minus twice the dead time, the other drive signal entirely disappears, and the dead time can now be brought toward zero. The speed with which the dead time can be brought toward zero should only be half as fast, because the dead time is present twice in a cycle, and the modulation characteristic should be linear. The further functioning of the drive device constructed in accordance with the principles of the present invention is shown in FIG. 2, again making reference to pulse diagrams for the drive signals ASO and ASU with increasing modulation MOD at, for example, 50, 85, 90, 95 and 100%. The upper power switch LSO is switched on longer for increasingly longer times with increasing modulation by means of the upper drive signal ASO. Correspondingly, the lower power switch LSU is switched off for increasingly longer times due to the drive signal ASU until, for example given a modulation of 90%, the high portion of the upper drive signal ASO corresponds only to twice the dead time (2×TZ). The lower drive signal can then unproblematically approach zero. Beginning at this point in time, therefore, the lower drive signal ASU is only at its high level within a period PER, so that the lower power switch LSU is then switched off. When the upper drive signal ASO shrinks to even less than two times one-half the dead time, then the other power switch continues to be switched off, but the upper power switch is not yet switched on for the full period resulting in, for example, a modulation of 95%. This can be achieved on the basis of the variable dead time which approaches zero, so that the upper power switch is then switched off, i.e., beginning with a specific modulation limit value, and a 100% modulation (MOD= 100%) is thus achieved. A corresponding set of circumstances applies when the modulation approaches zero, for example beginning with a modulation limit value of less than 5%, as shown in the upper three diagrams of FIG. 3.

In this manner, it is possible to generate symmetrical modulation having the limits 0% and 100% for both power semiconductors.

Some processors or microcontrollers are not capable of providing a 100% modulation; for example, the 80 C 196 KC microprocessor manufactured by Intel has a limit of 99.6% modulation pulse width. A shortening of the dead times in such a unit would result in a brief-duration bridge short, imposing a significant stress on the power semiconductors, possibly leading to their damage. In order to employ the principles of the present invention in such a microprocessor, a bit referred to as a power bit PB is generated at a further output P4 of the microprocessor or microcontroller MC. The power bit PB enables a "jump" from 99.6% to 100% modulation (full block). A chronological error of only 0.4% of the period time is in the range of different storage times for different power semiconductors and is of no significant consequence. Moreover, a higher-ranking regulator can not deliver more than 100% modulation in any event, even if the calculated value would require such an output. The extremely small error thus lies very close to a bend (knee) of the characteristic curve.

As a computational example, if one assume that the clock frequency of a semiconductor bridge is 10 kHz, this means that the period time resulting therefrom will be 100 µs. An error of 0.4% corresponds to 400 ns, which is usually lower than the dead time or is in the range of the drift of the rise, fall or delay times caused by increasing temperature.

Figure 3:
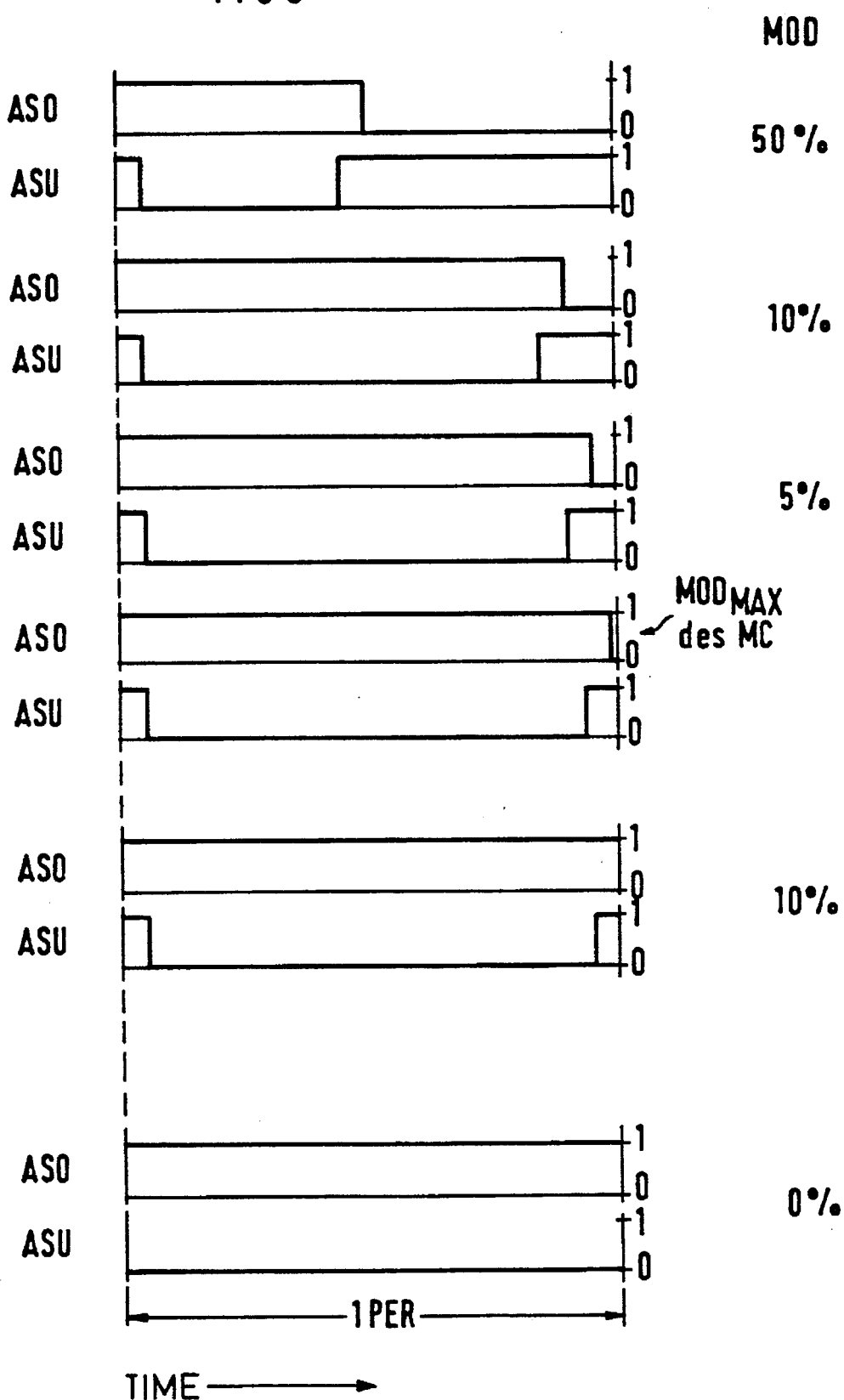

Three further pulse diagrams are shown in the lower portion of FIG. 3. The upper drive signal ASO is assumed, for the reasons stated above, not to be able to achieve a maximum modulation value $MOD_{max}$, but can only assume the value of 0.2% modulation, as an example. The power bit is therefore set given, for example, a modulation value of approximately 10%. This enables the upper drive signal ASO to have a high level and the upper power semiconductor switch LSO is switched off. The dead time can thus be shortened and the lower drive signal ASU can continuously have a zero (low) level so that the lower power semiconductor switch LSU can be conductive.

In theory, processors or microcontrollers simultaneously supply the modulation values at the beginning of a period; in practice, however, different starting times are often possible, for example in the range of 10 through 40 ns. In order to avoid the unwanted cross current producing component in the pulses in the push-pull stage, one of the modulation signals is externally delayed in a further embodiment of the invention. It is not necessary to precisely select the amount of the delay, because even if the delay is overly large, this will only result in an "error" which would be added to the dead time, so that any such "error" would be extremely small. Systematic errors in the nanosecond range can be unproblematically handled by the regulator.

Figure 4:
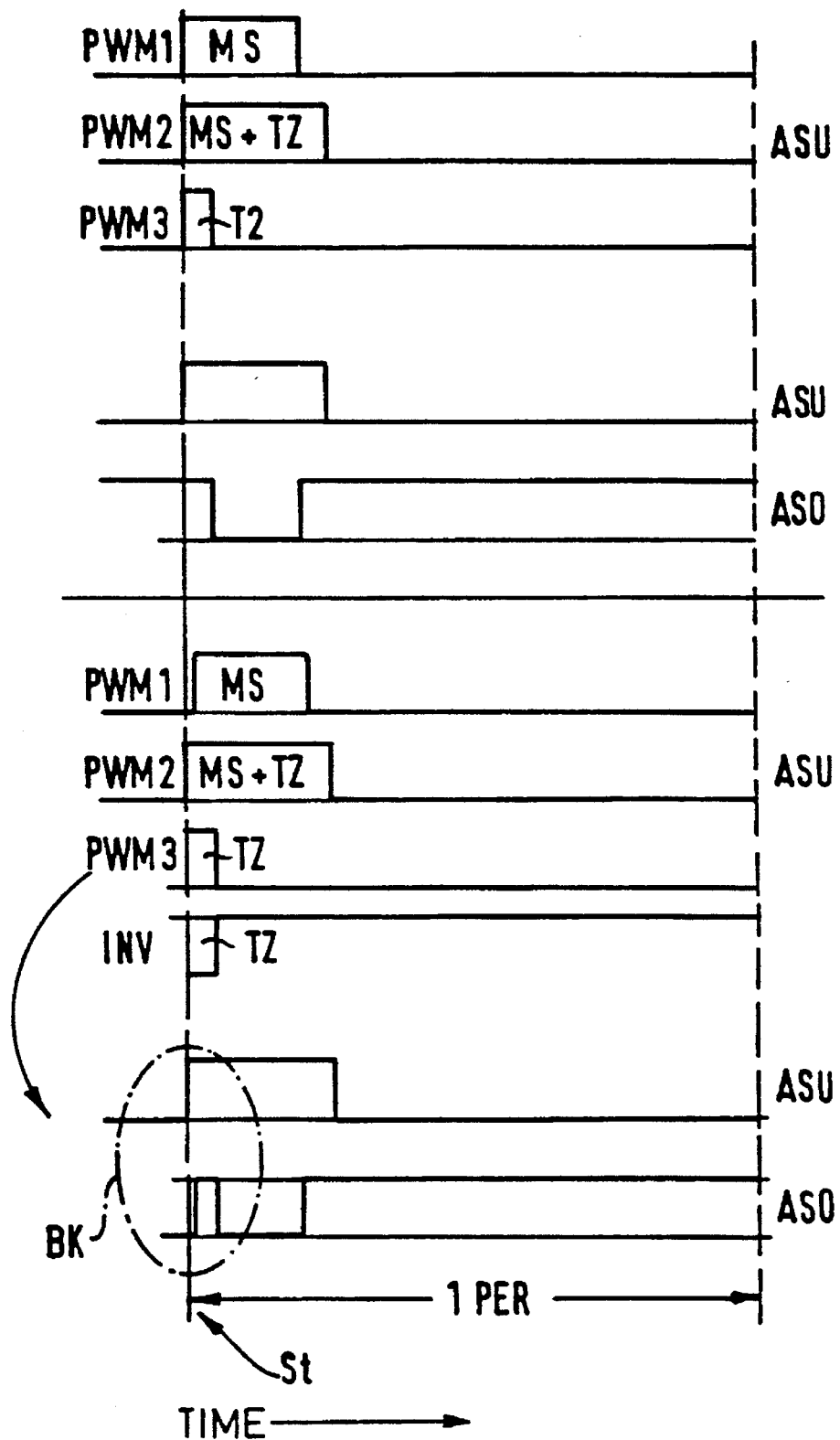
Figure 6:
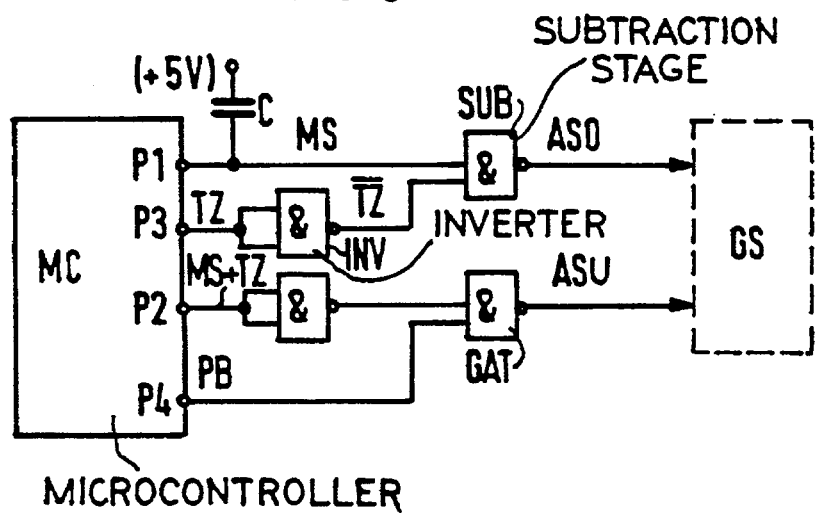

In the upper third of FIG. 4, the three modulation signals, and the drive signals ASO and ASU derived therefrom are shown as starting simultaneously. If, however, the pulse-width modulation signals PWM1, PWM2 and PWM3 are not precisely synchronized, for example if the pulse-width modulation signal PWM1 (MS) arrives later, this will result in the leading edge of the lower drive signal ASU starting at a time St somewhat later compared to the upper drive signal ASO. This will result in a brief-duration bridge short BK in the nanosecond range at the semiconductor switches of the push-pull stage. This is avoided in accordance with the principles of the present invention by the use of a capacitor C, shown in FIG. 6, provided at the modulation output P1 of the microcontroller MC. It is also possible to provide some other type of circuit element which imposes an appropriate delay (lag).

A drive circuit constructed in accordance with the principles of the present invention is shown in FIG. 5, as has been described in principle above. In this embodiment, the push-pull stage GS is a half-bridge, comprising the upper power switch LSO and the lower power switch LSU. The push-pull stage GS is driven by the microcontroller MC (or alternatively by a microprocessor and a further modulator or a further compare/capture unit) via an isolated drive transmitter. The microcontroller MC has three pulse-width modulation outputs (ports) P1, P2 and P3. The actual modulation signal MS is supplied at the output P1, and is conducted to a subtraction stage SUB. The modulation signal plus the dead time MS+TZ is present at the output P2, which is supplied as a drive signal ASU to the lower power switch LSU via the voltage separator PT. A signal corresponding to the dead time TZ is present at the output P3, which is supplied to the subtraction stage SUB in the form of an inverted dead time signal $\overline{TZ}$ by the operation of an inverter INV. The difference signal between the modulation signal MS and the inverted dead time $\overline{TZ}$ is supplied to the upper power switch LSO (via PT) as the drive signal ASO. In accordance with the principles of the present invention, when the actual modulation signal MS is equal to the dead time TZ, i.e., the modulation width corresponds to the dead time, the drive signal ASU for the lower power switch LSU continuously has the logic level "1", so that the lower power switch LSU is continuously shut off. As long as this is the case, the upper power switch LSO can be continuously switched on, i.e., the upper drive signal ASO can have a zero (low) level during this time. This is automatically achieved with a specific modulation limit value as a consequence of the drive means of the invention.

A further embodiment of the invention is shown in FIG. 6 which is particularly useful if the microcontroller MC is not capable of achieving 100% modulation (or 0% modulation) by itself. The actual modulation signal MS which is supplied to the subtraction stage SUB is again present at the output P1. In the simplest case, the subtraction stage is a NAND element, having an output at which the drive signal ASO is present for power switch LSO of the push-pull stage GS. The dead time TZ is present at the output P3, which is supplied to the subtraction stage SUB via a NAND element, which inverts the dead time TZ to obtain the inverted dead time signal $\overline{TZ}$, as already described with reference to FIG. 1. The modulation signal plus the dead time MS+TZ is present at the output P2, and this sum is supplied via a NAND element to a gate GAT, which in this embodiment comprises a further NAND element, having an output at which the drive signal ASU is present for the lower power switch LSU. At an output P4, a brief-duration pulse in the form of a power bit PB is supplied at regular intervals in the embodiment of FIG. 6. As an example, this power bit PB is supplied to the gate GAT. This permits the drive device to be operated in a full block mode, even given a modulation by the modulator (in this case, the microcontroller MC) which is not truly "100%".

When the drive device of the invention is employed as an inverse rectifier for, for example, a 220 V sinusoidal alternating voltage at 50 Hz, the power bit is set by a clock of 100 Hz by the microcontroller MC, so that one of the power transistors is full switched on while the other is full switched off or vice versa, in the regions of the minimum and maximum of the sine wave. The aforementioned capacitor C is connected at the output P1 of the microcontroller MC, in order to prevent the possibility of cross current components in the push-pull stage when a leading edge of the modulation signal, for example the PWM1 signal at the output P1, is not precisely chronologically synchronized with the other modulation signals.

The drive device of the invention is not limited to specific microprocessors or microcontrollers such as, for example, the aforementioned Intel microcontroller of the 196 series. A microcontroller operating as a pulse-width modulator need not necessarily be used, if long switching-period times are required. In that case, it is sufficient to provide respective pulse-width modulators at the outputs of the microcontroller.

Although modifications and changes may be suggested by those skilled in the art, it is the intention of the inventor to embody within the patent warranted hereon all changes and modifications as reasonably and properly come within the scope of his contribution to the art.

I claim as my invention:

1. A drive device for a push-pull stage having a first power switch and a second power switch, said drive device comprising:

pulse-width modulator means for generating a plurality of pulse-width modulation signals including a first output at which an actual pulse-width modulation output signal is present, a second output at which a sum signal is present comprising the sum of said actual pulse-width modulation output signal and a dead time signal, said sum signal being supplied to one of said first or second power switches as a drive signal therefor, and a third output at which said dead time signal is present;

means for inverting said dead time signal to obtain an inverted dead time signal;

means for subtracting said inverted dead time signal from said actual pulse-width modulation output signal to obtain a drive signal supplied to the other of said first or second power switches;

said pulse-width modulator means including means for varying a pulse-duty ratio of said dead time signal for automatically shortening said dead time signal in a limit region of the modulation of said actual pulse-width modulation output signal for a time during which one of said first or second power switches is continuously switched on and the other of said first or second power switches is continuously switched off.

2. A drive device as claimed in claim 1 wherein said pulse-width modulator means includes a fourth output at which a short power bit is present; and logic gate means for combining said power bit with said sum signal for forming said drive signal for said one of said first or second power switches.

3. A drive device as claimed in claim 2 wherein said push-pull stage generates an alternating voltage at a frequency, and wherein said power bit has a period corresponding to a frequency which is twice said frequency of said alternating voltage.

4. A drive device as claimed in claim 1 further comprising delay means connected at one of said outputs of said pulse-width modulator means for delaying the signal at said one of said outputs.

5. A drive device as claimed in claim 1 wherein said pulse-width modulator means comprises a stored value table for storing a plurality of modulation values for forming said actual pulse-width modulation output signal.

6. A drive device as claimed in claim 1 wherein said pulse-width modulator means includes means for calculating in real time a modulation value for said actual pulse-width modulation output signal.

7. A drive device as claimed in claim 1 wherein said pulse-width modulator means comprises means for generating the signals at each of said first, second and third outputs internally.

8. A drive device as claimed in claim 1 wherein said pulse-width modulator means includes a plurality of external logic elements for respectively generating said actual pulse-width modulation output signal, said sum signal and said dead time signal.

9. A drive device as claimed in claim 1 wherein said means for varying said pulse-duty ratio of said dead time signal comprises means for conducting an on-line operation for calculating said pulse-duty ratio dependent on a plurality of parameters associated with said first and second power switches and on a plurality of selected external influences.

10. A method for operating a push-pull stage having a first power switch and a second power switch, comprising the steps of:

generating a plurality of pulse-width modulation signals including an actual pulse-width modulation output signal, a dead time signal, and a sum signal comprising the sum of said actual pulse-width modulation output signal and a dead time signal;

supplying said sum signal to one of said first or second power switches as a drive signal therefor;

inverting said dead time signal to obtain an inverted dead time signal;

subtracting said inverted dead time signal from said actual pulse-width modulation output signal to obtain a further drive signal;

supplying said further drive signal to the other of said first or second power switches; and varying a pulse-duty ratio of said dead time signal for automatically shortening said dead time signal in a limit region of the modulation of said actual pulse-width modulation output signal for a time during which one of said first or second power switches is continuously switched on and the other of said first or second power switches is continuously switched off.

11. A method as claimed in claim 10 comprising the additional steps of:

generating a short power bit; and logically combining said power bit with said sum signal for forming said drive signal for said one of said first or second power switches.

12. A method as claimed in claim 11 wherein said push-pull stage generates an alternating voltage at a frequency, and wherein the steps of generating said power bit is further defined by generating a power bit having a period corresponding to a frequency which is twice said frequency of said alternating voltage.

13. A method as claimed in claim 10 comprising the additional step of delaying one of said actual pulse-width modulation signal, said dead time signal, or said sum signal.

14. A method as claimed in claim 10 wherein the step of generating said actual pulse-width modulation output signal is further defined by forming said actual pulse-width modulation output signal from values stored in a value table for containing a plurality of modulation values.

15. A method as claimed in claim 10 wherein the step of generating said actual pulse-width modulation output signal is further defined by calculating in real time a modulation value for said actual pulse-width modulation output signal.

16. A method as claimed in claim 10 wherein the step of varying said pulse-duty ratio of said dead time signal is further defined by conducting an on-line operation for calculating said pulse-duty ratio dependent on a plurality of parameters associated with said first and second power switches and on a plurality of selected external influences.

* * * * *